(12) United States Patent
Suzuki et al.

(10) Patent No.: US 7,777,979 B2
(45) Date of Patent: Aug. 17, 2010

(54) MAGNETIC DISK DEVICE TESTING METHOD AND TESTING DEVICE

(75) Inventors: Katsuji Suzuki, Kawasaki (JP); Yuichiro Yamazaki, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 169 days.

(21) Appl. No.: 12/256,202

(22) Filed: Oct. 22, 2008

(65) Prior Publication Data

US 2009/0231744 A1    Sep. 17, 2009

(30) Foreign Application Priority Data

Mar. 17, 2008   (JP) .............................. 2008-067445

(51) Int. Cl.
*G11B 27/36* (2006.01)

(52) U.S. Cl. .............................. 360/31; 360/53; 360/75

(58) Field of Classification Search ........................ None
See application file for complete search history.

(56) References Cited

U.S. PATENT DOCUMENTS 6,771,441 B2 *   8/2004   Tang et al. ..................... 360/31
6,985,419 B2 *   1/2006   Ikeda et al. ............... 369/53.23
7,593,180 B2 *   9/2009   Yun et al. .................. 360/78.04
7,609,470 B2 *  10/2009   Yamazaki ..................... 360/68
7,729,071 B2 *   6/2010   Harada ......................... 360/39
2003/0214743 A1 * 11/2003 Urata ........................... 360/53
2009/0195902 A1 *  8/2009 Moser et al. .................. 360/31

FOREIGN PATENT DOCUMENTS

JP    A 2005-235380    9/2005

* cited by examiner

*Primary Examiner*—Jason C Olson
(74) *Attorney, Agent, or Firm*—Greer, Burns & Crain, Ltd.

(57) ABSTRACT

A magnetic disk device testing method includes obtaining index values indicating the signal quality of an adjacent track at different positions scattered in the width direction in the adjacent track located in the vicinity of a target track on a magnetic disk after repeatedly writing data onto the target track, and determining a representative value of the index values indicating the signal quality of the adjacent track based on the obtained results, while incrementing the number of data write times; and estimating an index value indicating the signal quality of the adjacent track to be obtained where data is written onto the target track a larger number of times than the total number of data write times the data has been actually written in obtaining the index values, the index value being estimated with the use of the representative values decided in the representative value deciding.

5 Claims, 10 Drawing Sheets

MAGNETIC DISK DEVICE TESTING METHOD AND TESTING DEVICE

CROSS-REFERENCE TO RELATED APPLICATION

This application is based upon and claims the benefit of priority of the prior Japanese Patent Application No. 2008-067445 filed on Mar. 17, 2008, the entire contents of which are incorporated herein by reference.

FIELD

The present invention generally relates to magnetic disk device testing methods and testing devices, and more particularly, to a method and a device for testing a magnetic disk device such as a hard disk drive.

BACKGROUND

In a magnetic disk device such as a hard disk drive (HDD), a recording/reproducing head that floats above a rotating magnetic disk records data onto the magnetic disk and reads data from the magnetic disk.

It is known that the recording density of a magnetic disk in a HDD can be increased by narrowing the space (the distance) between the recording/reproducing head and the magnetic disk (see Japanese Patent Application Publication No. 2005-235380, for example). As the distance between the recording/reproducing head and the magnetic disk becomes shorter, however, there is a higher possibility that the data recorded in the tracks adjacent to a predetermined target track is overwritten due to the magnetic field generated when data is written onto the target track. This is also called "write spread", and due to the write spread, the data recorded in the adjacent tracks might be erased (a so-called "side erase").

To counter this problem, the HDD manufacturers conduct tests to determine the number of write times that does not cause write spreads, and use the technique for guaranteeing the number of write times. In one of those tests, data is repeatedly written onto the target track the guaranteed number of write times that is set for each HDD model, and data is read from the tracks adjacent to the target track. The degree of degradation of the signal quality is then measured. The guaranteed number of write times set in this test may be 100 millions, for example.

In a case where data is read from the adjacent tracks after data is repeatedly written onto the target data the guaranteed number of write times, as described above, the number of times the data is actually written is enormous, and a long period of time might be required between the start and the end of each test. To shorten the test time, the degree of degradation may be measured after data is written onto the target track only $\frac{1}{10}$ or $\frac{1}{100}$ of the guaranteed number of write times, and the degree of degradation corresponding to the guaranteed number of write times may be estimated from the measured degree of degradation.

In the case where the degree of degradation corresponding to the guaranteed number of write times is estimated, however, there is a large difference between the estimated degree of degradation and the degree of degradation measured after the data is actually written the guaranteed number of write times. Therefore, there is a high probability that the degree of degradation cannot be accurately estimated. The inventor conducted various examinations on the cause of this problem, and has reached the conclusion that the problem lies in the method of measuring the degree of degradation.

SUMMARY

According to an aspect of the present invention, there is provided a testing method and device that can estimate an index value indicating the signal quality with high accuracy in accordance with the number of times data has been written on a magnetic disk, and can conduct each test in a short period of time.

According to another aspect of the present invention, there is provided a magnetic disk device testing method that includes: obtaining index values indicating the signal quality of an adjacent track at different positions scattered in the width direction in the adjacent track located in the vicinity of a target track on a magnetic disk after repeatedly writing data onto the target track, and determining a representative value of the index values indicating the signal quality of the adjacent track based on the obtained results, while incrementing the number of data write times; and estimating an index value indicating the signal quality of the adjacent track to be obtained where data is written onto the target track a larger number of times than the total number of data write times the data has been actually written in the index value obtaining step, the index value being estimated with the use of the representative values decided in the representative value deciding step.

DESCRIPTION OF EMBODIMENTS

The following is a description of an embodiment of a testing device for testing the number of write times guaranteed in a disk device of the present invention, with reference to FIGS. 1 through 9.

Figure 1:
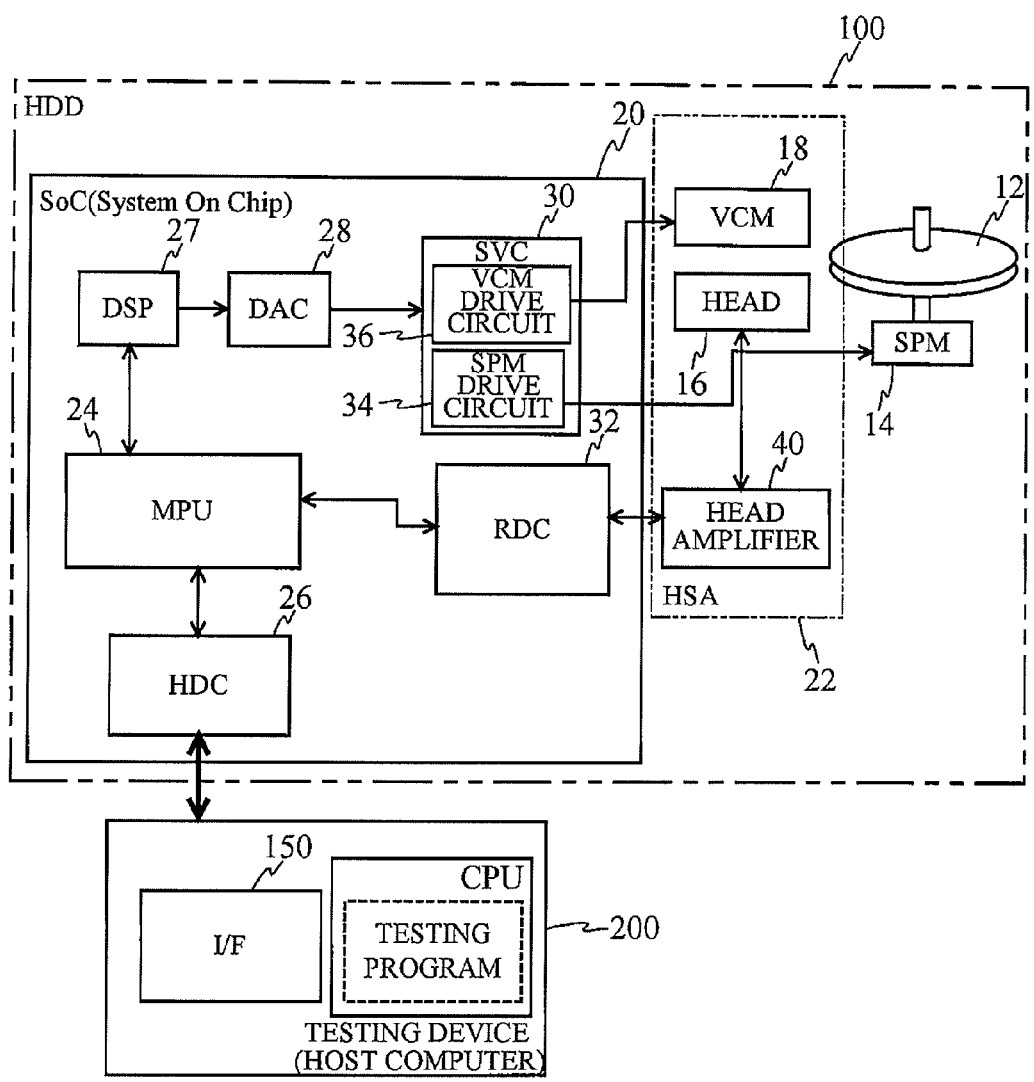
FIG. 1 is a block diagram of a HDD in accordance with an embodiment of the present invention.

FIG. 1 schematically shows the structures of a testing device 200 of this embodiment and a hard disk drive (HDD) 100 that can be tested by the testing device 200. As depicted in FIG. 1, the HDD 100 can be connected to the testing device 200 via a bus such as a SAS (Serial Attached SCSI).

The HDD 100 includes: one or more magnetic disks 12; a spindle motor (SPM) 14 that rotatively drives the magnetic disk 12; a head stack assembly (HSA) 22 formed with a magnetic head (HEAD) 16, a voice coil motor (VCM) 18, and a head amplifier 40; and a system on chip (SoC) 20 that performs drive control on the spindle motor 14, the voice coil motor 18, and the likes.

The magnetic head 16 of the head stack assembly 22 writes data onto the magnetic disk 12, and reads data from the magnetic disk 12. The voice coil motor 18 causes the magnetic head 16 to perform seeking (move) on the magnetic disk 12.

The SoC 20 is a highly integrated chip that includes a hard disk controller (HDC) 26, a servo controller (SVC) 30, a read and write channel (RDC) 32, a micro processing unit (MPU) 24, and firmware for performing operation control on each of the components.

The hard disk controller 26 includes an error correction circuit, a buffer control circuit, a cache control circuit, and an interface control circuit. The hard disk controller 26 performs read/write control operations, and the likes.

The SVC 30 includes a SPM drive circuit 34 and a VCM drive circuit 36. The SPM drive circuit 34 performs drive control on the spindle motor 14, in accordance with an instruction transmitted from the MPU 24 via a servo DSP (Digital Signal Processing) 27 and a D-A converter (DAC) 28. In accordance with an instruction transmitted from the MPU 24, the VCM drive circuit 36 performs drive control on the voice coil motor 18, so as to control the servo (the positioning) of the magnetic head 16 on the magnetic disk 12.

The read and write channel 32 includes a modulation circuit for writing write data onto the magnetic disk 12, a parallel-serial conversion circuit for converting write data into serial data, and a demodulation circuit for reading data from the magnetic disk 12. The read and write channel 32 exchanges data (signals) with the head amplifier 40. The head amplifier 40 includes a write amplifier (not depicted) for switching the polarities of the recording current to be supplied to the magnetic head 16 in accordance with write data, and a preamplifier (not depicted) for amplifying reproduction signals detected by the magnetic head 16.

The MPU 24 controls the entire HDD 100, and more particularly, performs head positioning control, interface control, initializing and setting operations for each peripheral LSI, defect control, and the likes.

The testing device (the host computer) 200 includes a central processing unit (CPU), and a testing program is installed in the CPU. According to the testing program, the CPU issues a testing operation instruction to the HDD 100 (or the HDC 26) via an interface 150, and obtains the result of each test conducted in the HDD 100 via the interface 150.

Figure 2:
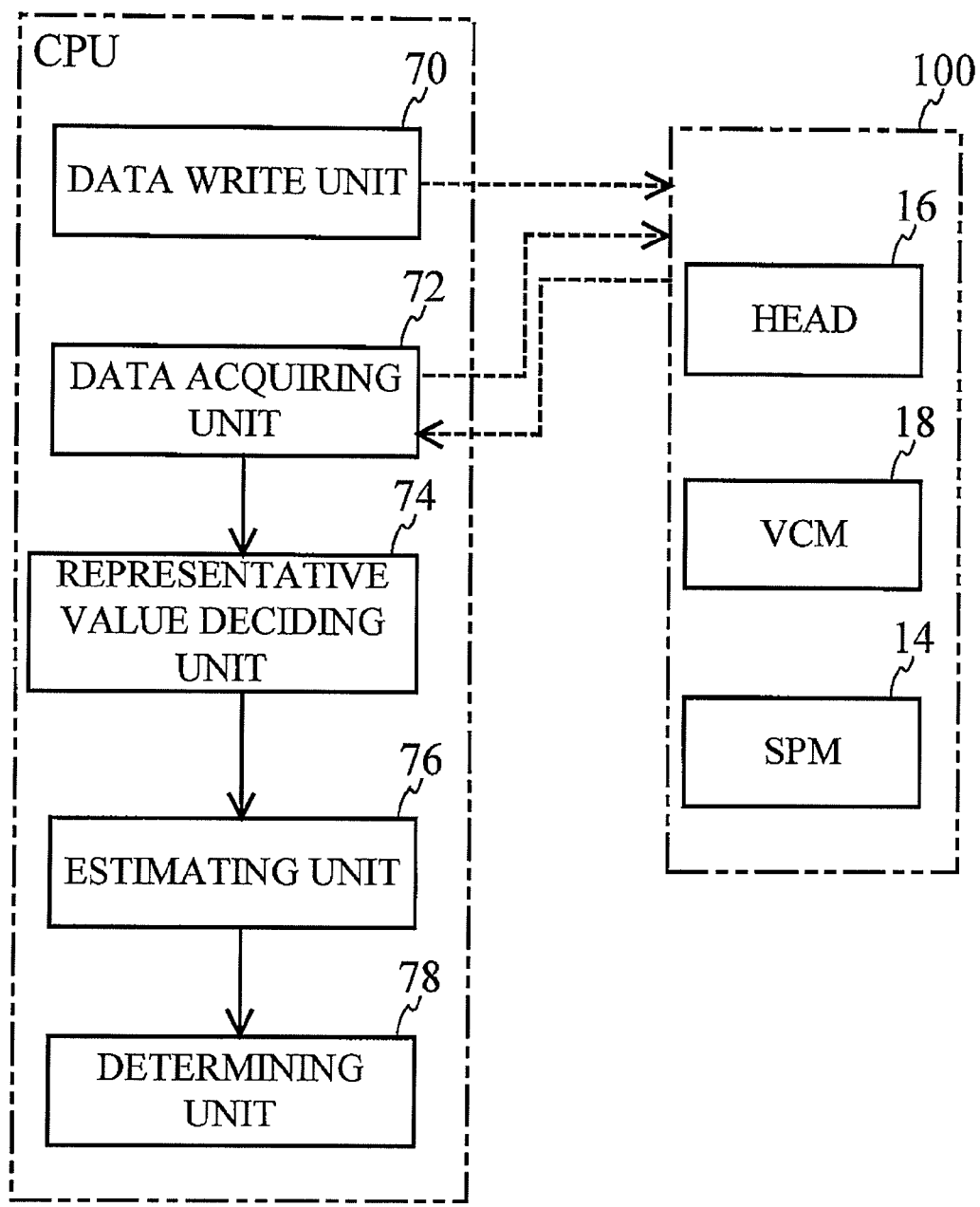
FIG. 2 is a functional block diagram of the CPU of the testing device.

FIG. 2 is a functional block diagram of the CPU of the testing device 200. As depicted in FIG. 2, the CPU of the testing device 200 includes a data write unit 70, a data acquiring unit 72, a representative value deciding unit 74, an estimating unit 76, and a determining unit 78. The data write unit 70 writes data (the later described test data) onto the magnetic disk 12, using the magnetic head 16, the voice coil motor 18, and the spindle motor 14. The data acquiring unit 72 reads (acquires) the data written on the magnetic disk 12, using the magnetic head 16, the voice coil motor 18, and the spindle motor 14.

Figure 3A:
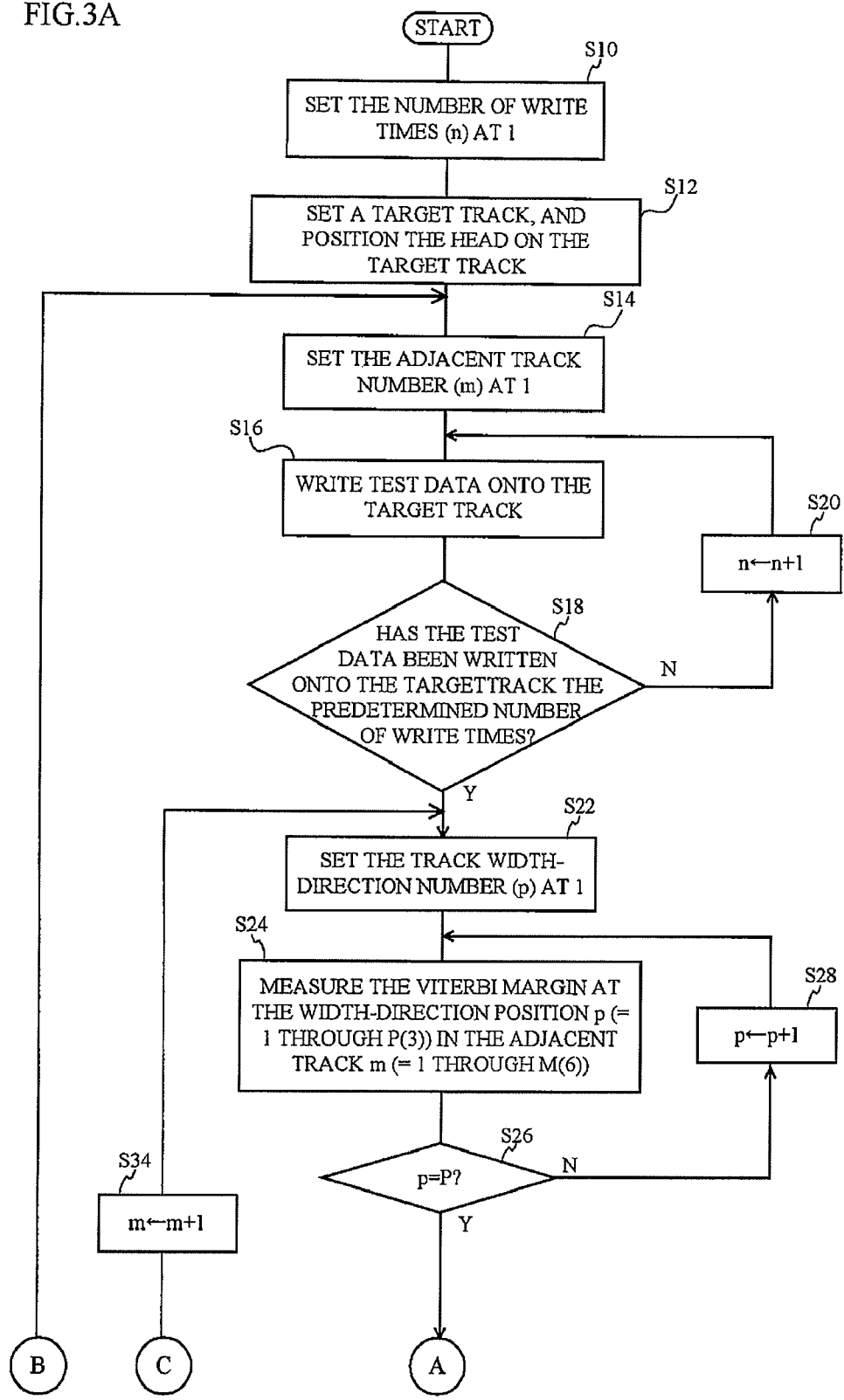
FIGS. 3A and 3B are flowcharts of a testing sequence of procedures to be carried out by the PCU of the testing device.
Figure 3B:
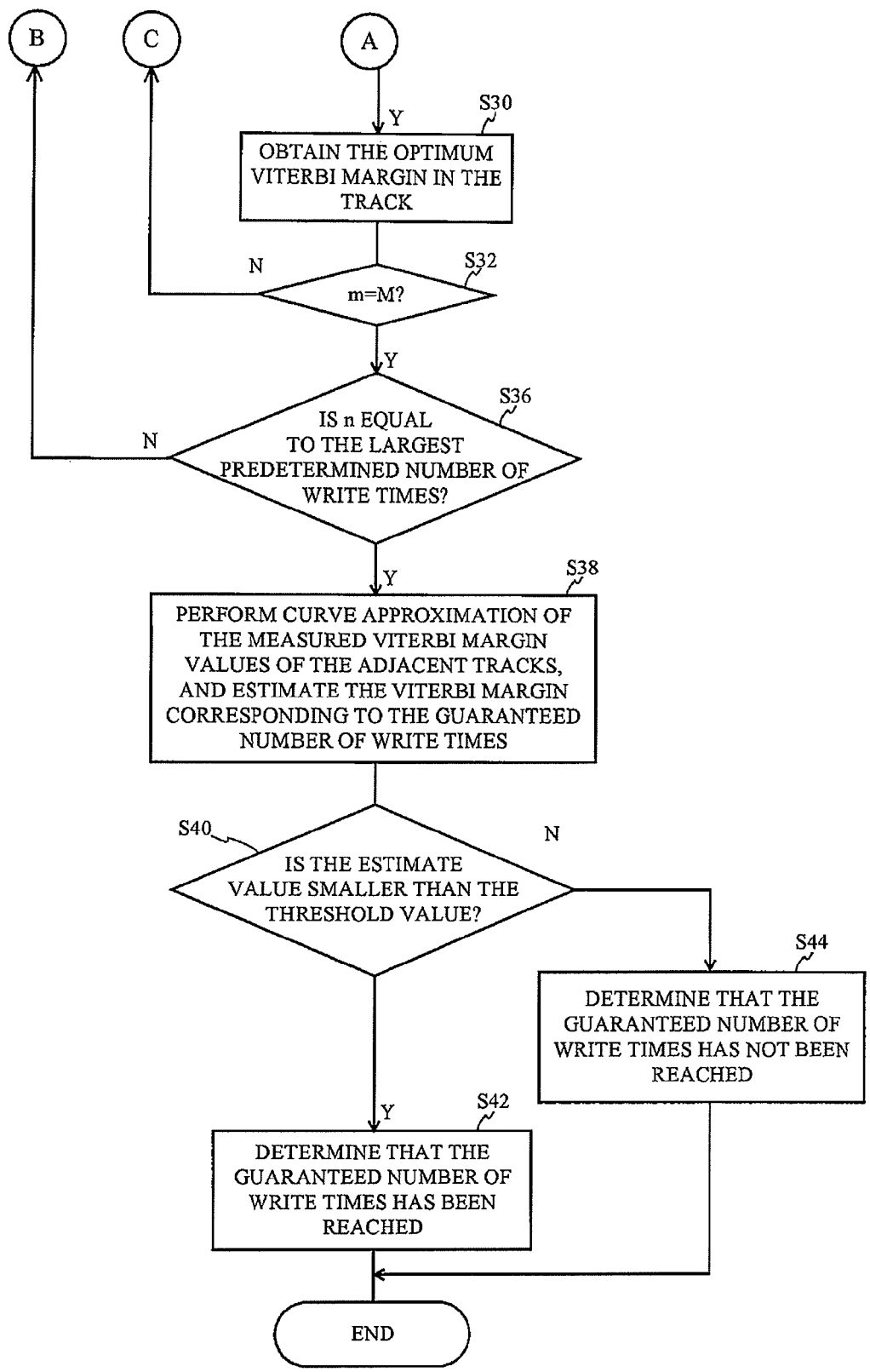

Referring now to the flowchart depicted in FIGS. 3A and 3B and other drawings if necessary, a method for testing the above described HDD 100 with the use of the testing device 200 is described. The testing procedures described below are carried out by the CPU of the testing device 200 in accordance with the testing program, and explanation of the operating subject is omitted unless absolutely necessary.

The operation illustrated in the flowchart depicted in FIGS. 3A and 3B is started, only when the HDD 100 to be tested is connected to the testing device 200. The same data (also referred to as the "initial data") is written beforehand in each corresponding sectors of all the tracks on the magnetic disk 12.

Figure 4:
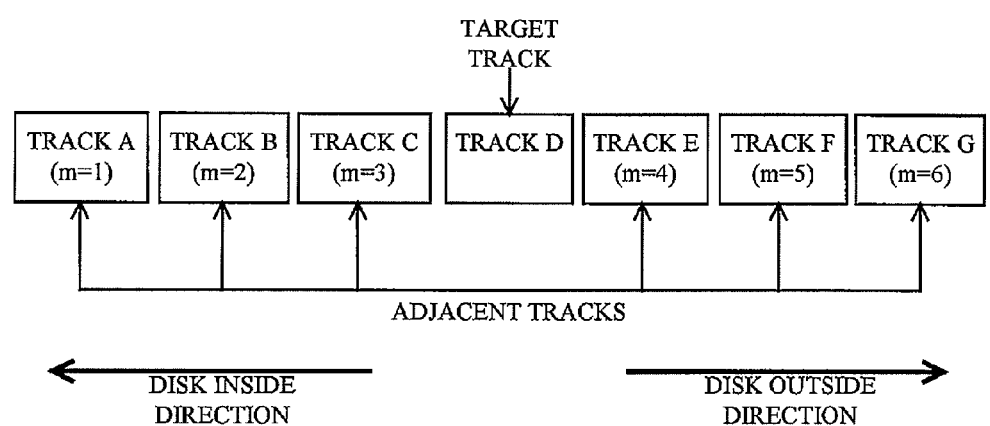
FIG. 4 is a schematic view for explaining a target track and adjacent tracks.
Figure 5:
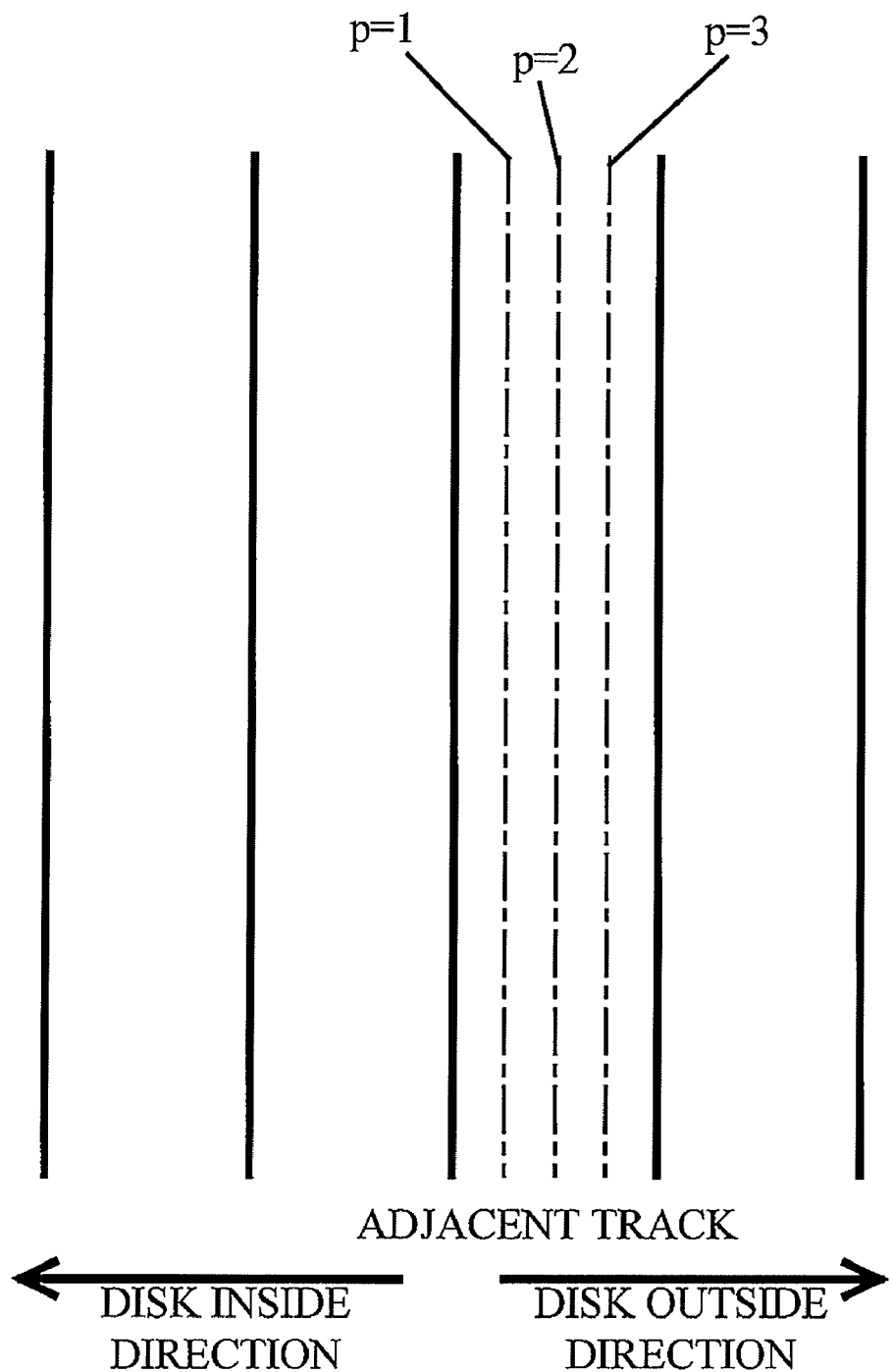
FIG. 5 is a schematic view for explaining the width-direction positions (p=1 through 3) in the adjacent tracks.

In the flowchart depicted in FIGS. 3A and 3B, the parameter n representing the number of write times is set at 1 in step S10. In step S12, the track onto which data is to be written (the target track) is determined, and the magnetic head 16 is positioned above the target track. In the following description, the track D schematically depicted in FIG. 4 is set as the target track.

In step S14, the adjacent track number m is set at 1. Adjacent track numbers m are allotted to the three adjacent tracks (six adjacent tracks in total) on the inner (or the outer) side of the target track on the disk, in the ascending order from the center of the disk. In this embodiment, "1" through "M" (M being 6 in this example) are allotted in this order as the adjacent track numbers m to the three adjacent tracks A through C on the inner side of the target track D on the disk, and to the three adjacent tracks E through G on the outer side of the target track D on the disk.

In the above example, the adjacent tracks are each three tracks on the inner side and the outer side of the target track. However, the adjacent tracks are not limited to them, and may be any number (10, for example) of tracks on the inner side and the outer side of the target track.

In step S16 of FIG. 3A, writing test data (different from the initial data) is started on the target track set in step S12. The writing is performed under the control of the MPU 24 that receives a write instruction from the CPU (the data write unit 70 depicted in FIG. 2) of the testing device 200 via the hard disk controller 26. More specifically, the MPU 24 performs drive control on the voice coil motor 18 and the spindle motor 14, and the test data is written from the magnetic head 16. In this manner, the test data is written onto the target track. The drive control on the motors 18 and 14 is performed by the MPU 24 via the DSP 27, the DA converter 28, and the servo controller 30 (the VCM drive circuit 36 and the SPM drive circuit 34). The control on the writing operation is performed by the MPU 24 via the read and write channel 32 and the head amplifier 40.

In step S18, a check is made to determine whether the test data has been written on the target track a predetermined number of times. The predetermined number of times may be $1000 (10^3)$, $10000 (10^4)$, or $100000 (10^5)$, for example. In this embodiment, $100000 (10^5)$ is the "predetermined maximum number of write times". The predetermined maximum number of write times defines the upper limit of the number of times the test data is written on the target track. Since the data is written for the first time at this point, the result of the determination of step S18 is negative. In step S20, n is incremented by 1 (n←n+1), and the operation returns to step S16.

The procedures and determination of steps S16, S18, and S20 are repeated. When the result of the determination of step S18 becomes positive (when the number of times the test data has been written reaches the first predetermined number of times (1000)), the operation moves to step S22.

Figure 6:
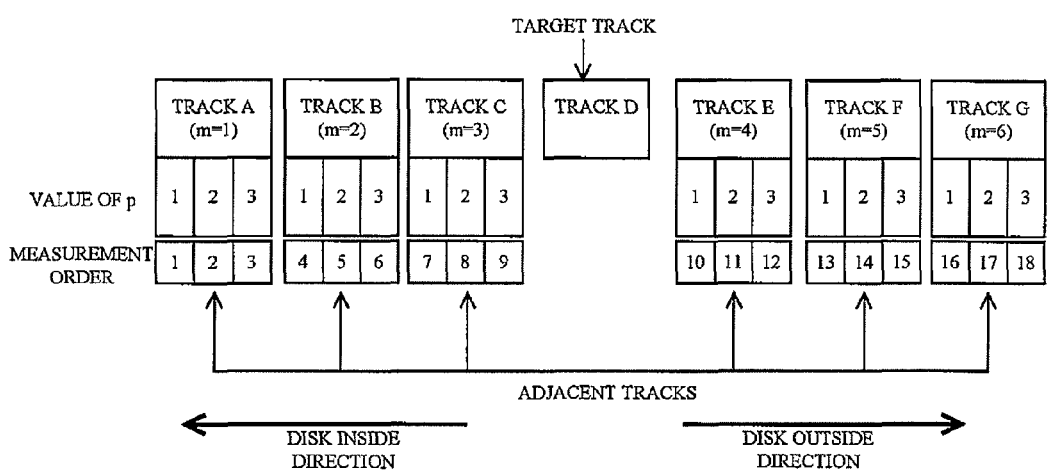
FIG. 6 shows the Viterbi margin measurement order.

In step S22, the width-direction number p in the track is set at 1. Width-direction numbers are allotted to the center position in each track and measurement positions that are offset inwardly and outwardly from the center position in the track by predetermined distances on the disk. In this embodiment, the center position is set at p=2, the position offset inwardly on the disk is set at p=1, and the position offset outwardly on the disk is set at p=3 (=P (the maximum value of p)). In this example case, the width-direction numbers p (=1 through 3) are allotted to all the adjacent tracks A through C and E through G. Accordingly, the width-direction numbers p are allotted to 18 (=3×6) spots in total, as schematically depicted in FIG. 6. Although the width-direction numbers p are 1 through 3 in this example, any numbers greater than 1 may be used as p.

In step S24, the CPU (the data acquiring unit 72 depicted in FIG. 2) uses the magnetic head 16 or the like to read the data written on the entire track at the width-direction position p (=1) of the adjacent track of m=1 (the track A), and measures a Viterbi metric margin (VVM). The Viterbi metric margin (hereinafter referred to as the Viterbi margin) is a numeric value representing the probability that some other value is selected by a Viterbi detection technique for selecting an optimum value. The Viterbi margin directly represents the error rate. The Viterbi margin is measured by a Viterbi detector (not depicted) provided in the read and write channel 32.

In step S26, a check is made to determine whether p is P (=3). Since p is only 1 at this point, the result of the determination is negative. After p is incremented by 1 (p←2) in step S28, the operation returns to step S24. The Viterbi margin is measured at the width-direction position (p=2) in the track A in step S24, and the operation then moves on to step S26. Since p is 2 at this point, the result of the determination of step S26 is negative.

After the procedure of step S28 (p←3) is carried out, the operation again returns to step S24. In step S24, the Viterbi margin is measured at the width-direction position (p=3) in the track A. As the result of the determination of step S26 becomes positive this time, the operation moves on to step S30.

In step S30, the CPU (the representative value deciding unit 74 depicted in FIG. 2) compares the Viterbi margins (the three Viterbi margins) measured in the adjacent track A, and obtains the optimum value. Hereinafter, the optimum Viterbi margin will be referred to as the "Viterbi margin representative value". As the optimum value among the three Viterbi margins is set as the representative value, it is possible to carry out more accurate Viterbi margin measurement in this embodiment, taking into account the width-direction positions in the adjacent track A on which the initial data was written.

In step S32, a check is made to determine whether m is M (=6). Since m is 1 at this point, the result of the determination is negative. After m is incremented by 1 (m←2) in step S34, the operation returns to step S22.

In step S22, p is returned to 1. In step S24, the Viterbi margin is measured at the width-direction position (p=1) in the adjacent track B (m=2). After the determination is made in step S26 and the procedure of step S28 (p←p+1) is carried out, the operation returns to step S24. The procedure of step S24 is then carried out twice, to measure the Viterbi margins at the respective width-direction positions (p=2, 3).

In step S30, the optimum Viterbi margin (the Viterbi margin representative value) of the track B is obtained. In step S32, a check is made to determine whether m is M (=6). Since m is 2 at this point, the result of the determination is negative. After m is incremented by 1 (m←3) in step S34, the operation returns to step S22.

After that, the procedure of step S22, the loop formed with steps S24 through S28, and the procedures of steps S30, S32, and S34 are repeated. Through this repetitive operation, the Viterbi margins are measured in the measurement order (1 through 18) depicted in FIG. 6, and the optimum Viterbi margin (the Viterbi margin representative value) of each track is obtained. When the result of the determination in step S32 becomes positive (when m becomes equal to M (=6)), the operation moves on to step S36.

Through the procedures described so far, the Viterbi margin representative values of the adjacent tracks A through C and E through G where the test data has been written onto the target track D1000 ($10^3$) times are obtained.

In step S36, a check is made to determine whether the number of write times n is equal to the maximum predetermined number of write times (100000 ($10^5$) in this embodiment). Since n is 1000 ($10^3$) at this point, the result of the determination is negative, and the operation returns to step S14.

After the adjacent track number m is returned to 1 in step S14, the procedures of steps S16, S18, and S20 are repeated, so as to repeatedly write the test data onto the target track (the track D). When the test data is written on the target track D for the 10000th ($10^4$th) time, the result of the determination in step S18 becomes positive.

After that, the procedure of step S22, the loop formed with steps S24 through S28, and the procedures of steps S30, S32, and S34 are repeated in the same manner as described above. Through this repetitive operation, the Viterbi margins are measured in the measurement order (1 through 18) depicted in FIG. 6, and the optimum Viterbi margin (the Viterbi margin representative value) of each track is obtained.

Through the procedures described so far, the Viterbi margin representative values of the adjacent tracks A through C and E through G where the test data has been written onto the target track D10000 ($10^4$) times are obtained.

When the result of the determination in step S36 is again negative, the operation returns to step S14. After the adjacent track number m is returned to 1, the procedures of steps S16, S18, and S20 are repeated, so as to repeatedly write the test data onto the target track (the track D). When the test data is written on the target track D for the 100000th ($10^5$th) time, the operation moves to step S22. The procedure of step S22, the loop formed with steps S24 through S28, and the procedures of steps S30, S32, and S34 are then repeated in the same manner as described above. Through this repetitive operation, the Viterbi margins are measured in the measurement order (1 through 18) depicted in FIG. 6, and the optimum Viterbi margin (the Viterbi margin representative value) of each track is obtained.

Through the procedures described so far, the Viterbi margin representative values of the adjacent tracks A through C and E through G where the test data has been written onto the target track D100000 ($10^5$) times are obtained.

Figure 7A:
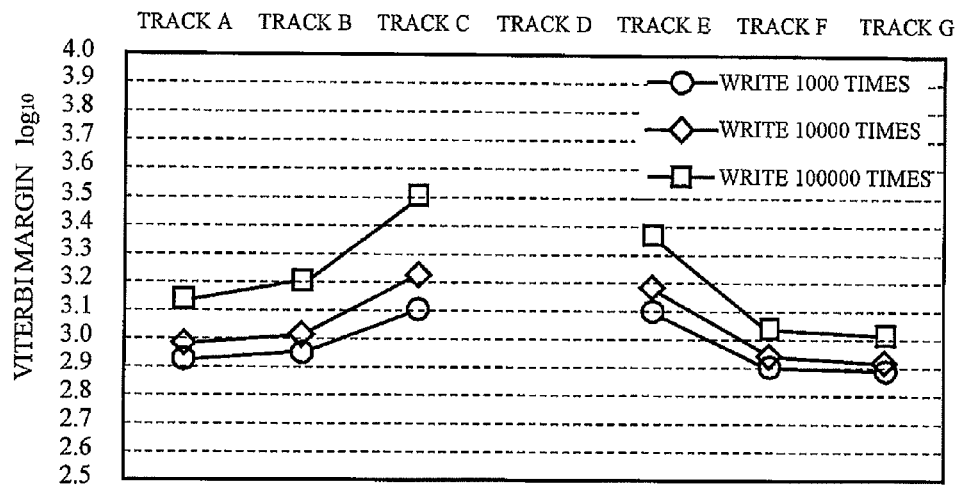
FIG. 7A is a graph showing the results of the Viterbi margin measurement in the respective adjacent tracks.
Figure 7B:
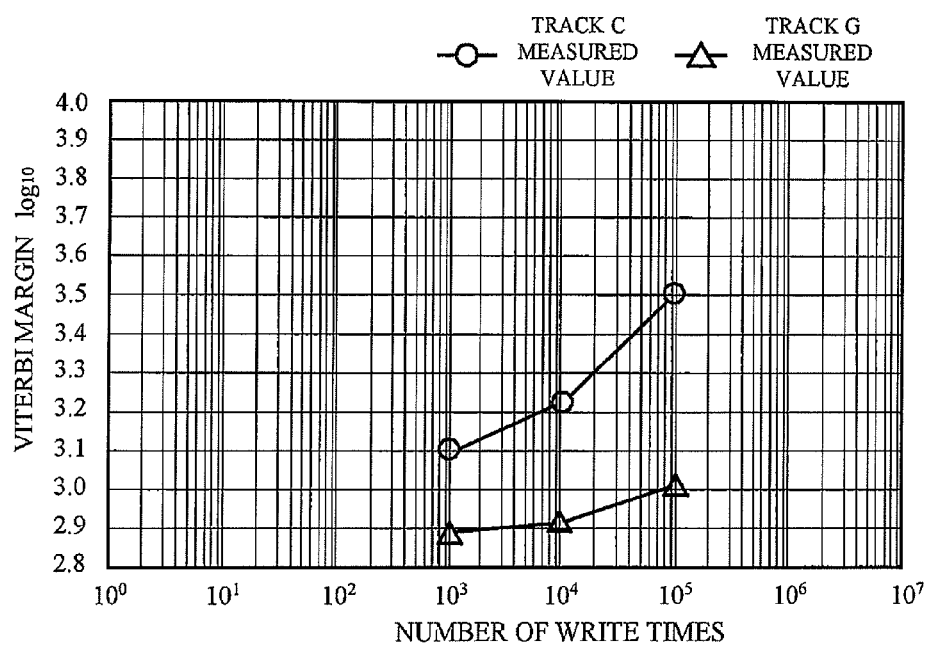
FIG. 7B is a graph showing the results of Viterbi margin measurement in the track C and track G.

FIG. 7A is a graph collectively showing the Viterbi margin representative values obtained through the procedures described so far. As can be seen from the graph in FIG. 7A, the influence of the test data write onto the target track D (the side erase due to write spread) is larger at a position closer to the target track D. Of the results of the above tests, the graph in FIG. 7B shows the results of the test conducted on the adjacent track C closest to the track D, and the test conducted on the adjacent track G farthest from the track D.

Referring back to FIG. 3B, in step S38, the CPU (the estimating unit 76 depicted in FIG. 2) performs curve approximation of the Viterbi margin measurement values of the adjacent tracks, and estimates the Viterbi margin to be obtained when the number of write times is larger than the number of times writing has been actually performed. The number of write times larger than the number of times writing has been actually performed is a predetermined number of write times guaranteed in the HDD 100, which is 1000000

Figure 8A:
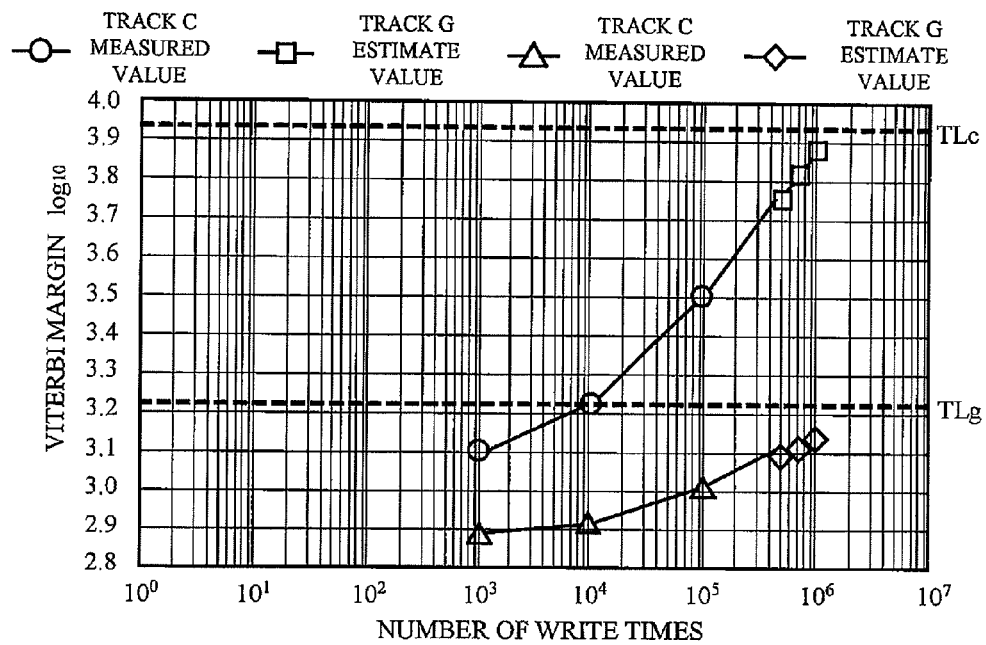
FIG. 8A is a graph showing the Viterbi margins estimated by curve approximation of the graph depicted in FIGS. 7B, and 8B is a graph showing the actually measured Viterbi margins.

($10^6$) in this embodiment. FIG. 8A shows the results of estimation obtained through curve approximation of the graphs depicted in FIG. 7B.

Figure 8B:
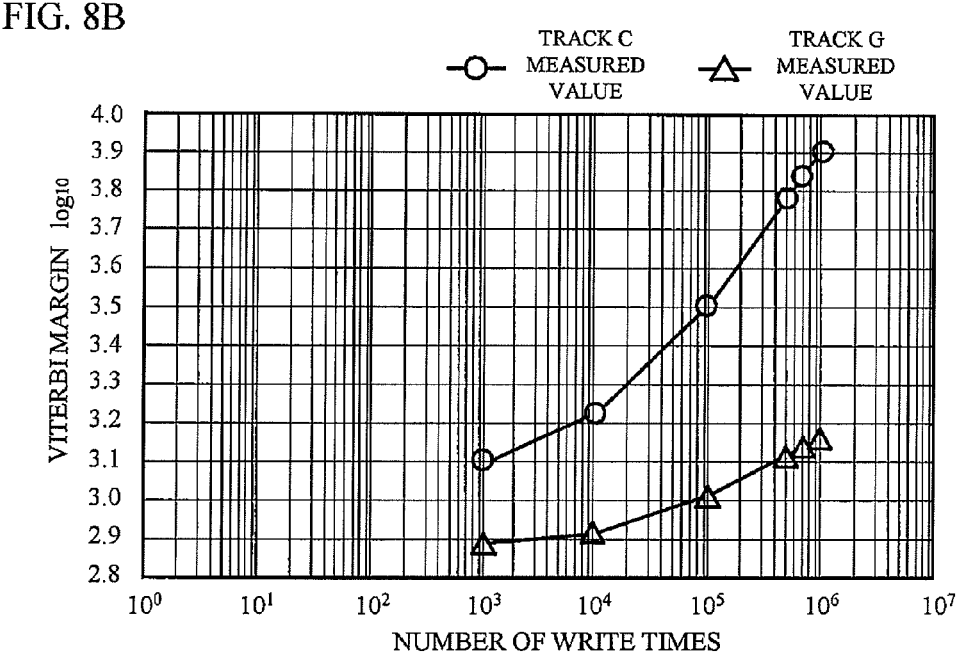

FIG. 8B shows the test results obtained when the test data is actually written on the target track 1000000 times. As can be seen from FIGS. 8A and 8B, the estimation results depicted in FIG. 8A are substantially the same as the actual measurement results depicted in FIG. 8B. Although only the estimate values on the adjacent track C and the adjacent track G are depicted in FIG. 8A, the same estimation as above is performed on the other adjacent tracks A, B, E, and F in step S38.

Figure 9A:
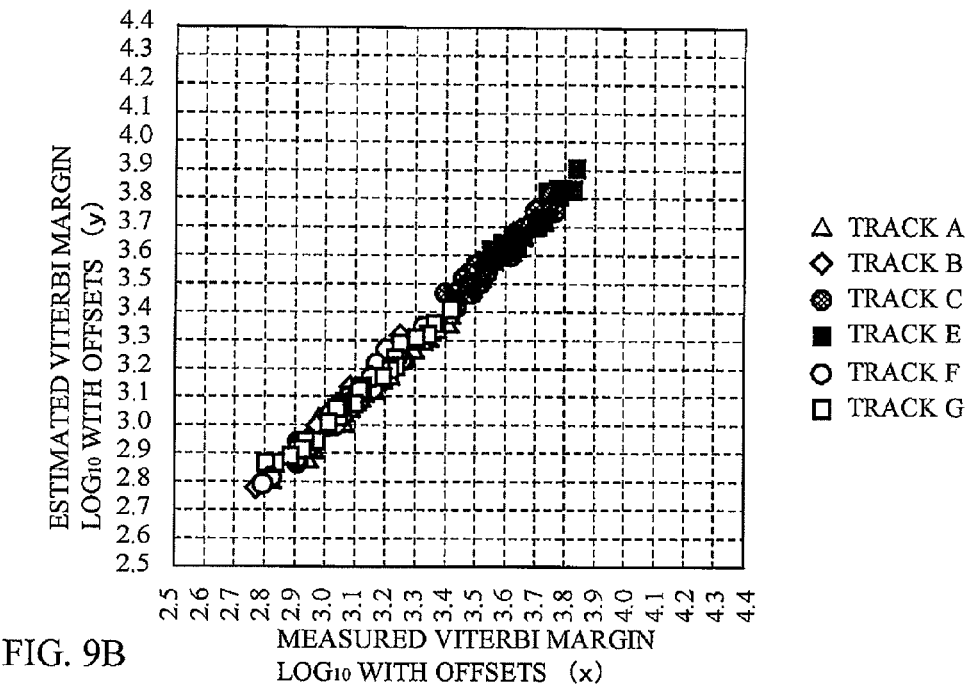
FIG. 9A shows the relationship between the estimate values of Viterbi margins and the actually measured values of Viterbi margins in accordance with a method of the present invention.
Figure 9B:
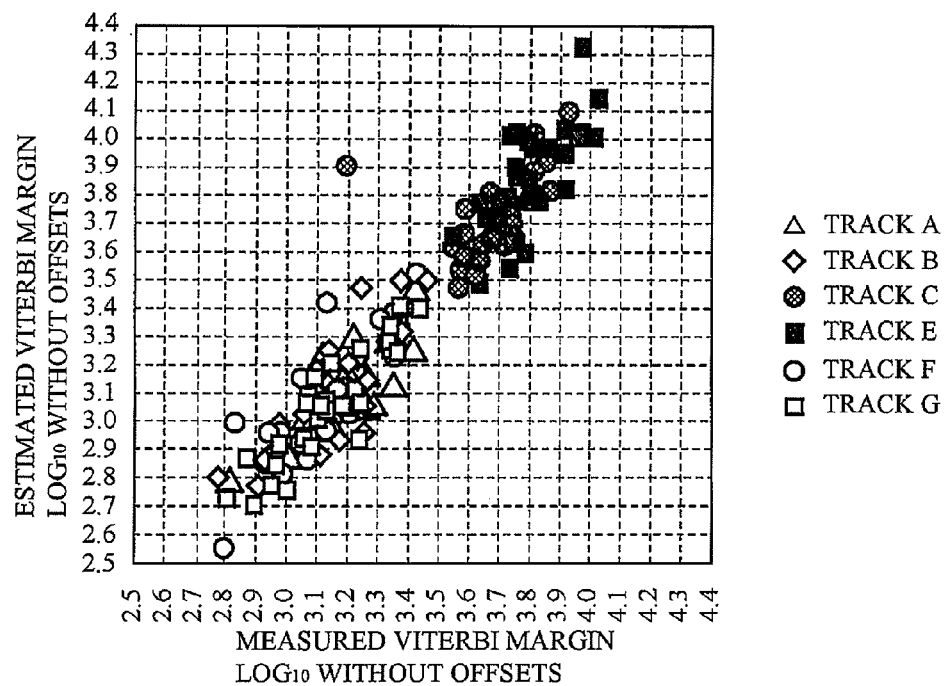
FIG. 9B shows the relationship between the estimate values of Viterbi margins and the actually measured values of Viterbi margins in accordance with a conventional method.

FIG. 9A shows the relationship between the estimate values of Viterbi margins estimated in the above manner (with offsets) and the actual measurement values of Viterbi margins measured where the test data has been actually written 1000000 times. FIG. 9B shows the results of measurement carried out where the Viterbi margins are measured at one location (the width-direction center position (P=2)), with the width-direction position in the adjacent track being fixed (without offsets). As can be seen from FIGS. 9A and 9B, the results of estimation in this embodiment (FIG. 9A) are plotted mainly on a linear function having a slope of 1 (y=x), while the results of measurement (FIG. 9B) are plotted over a wide range. As is apparent from this comparison, the differences between the estimate values and the actual measurement values are made smaller by the method in accordance with this embodiment.

Referring back to the flowchart depicted in FIG. 3B, in step S40, the CPU (the determining unit 78 depicted in FIG. 2) compares the result of the estimation of step S38 with a threshold value, to determine whether the estimation result is smaller than the threshold value. A threshold value is set for each of the tracks A through C and E through F. For example, the adjacent track C has the threshold value TLc depicted in FIG. 8A, and the adjacent track G has the threshold value TLg depicted in FIG. 8A. Each of the threshold values can be determined by the proximity to the target track D. Accordingly, the tracks C and E have the same threshold value, the tracks B and F have the same threshold value, and the tracks A and G have the same threshold value, for example.

As can be seen from FIG. 8A, the estimation results about the adjacent tracks C and G are not larger than the threshold values TLc and TLg. If the estimation results about the other adjacent tracks are not larger than the respective threshold values, the result of the determination in step S40 is positive. In such a case, the operation moves to step S42, and the CPU determines that the guaranteed number of write times (1000000) is reached. The CPU then ends the operation illustrated in FIGS. 3A and 3B.

If the estimation result about at least one of the adjacent tracks A through C and E through F is larger than the threshold value, the result of the determination in step S40 is negative. In such a case, the operation moves on to step S44, and the CPU determines that the guaranteed number of write times is not reached. The CPU then ends the operation.

As is apparent from the above description, the series of procedures (the loop) of steps S24, S26, and S28 in the flowchart depicted in FIG. 3B is equivalent to the index value obtaining step in the claims. Also, step S38 is equivalent to the estimating step in the claims, and steps S40, S42, and S44 are equivalent to the determining step in the claims. The CPU carrying out the series of procedures (the loop) of steps S24, S26, and S28 embodies the data acquiring unit of the claims. The CPU carrying out the procedure of step S30 embodies the representative value deciding unit of the claims. The CPU carrying out the procedure of step S38 embodies the estimating unit of the claims.

As described so far, in accordance with this embodiment, after the test data is repeatedly written on the target track D on the magnetic disk 12, the Viterbi margins are obtained at different positions in the width direction in each of the adjacent tracks A through C and E through F (step S24). With the use of the Viterbi margins, the representative value of the Viterbi margins of each of the adjacent tracks is determined (step S30). Accordingly, each representative value can be determined, with the initial-data written positions and the properties of the width-direction positions in each of the adjacent tracks being taken into account. Also, the Viterbi margins to be obtained where data is written a larger number of times than the number of times the test data has been actually written onto the target track is estimated from the representative values obtained by taking into account the initial-data written positions and the properties of the width-direction positions in each of the adjacent tracks. Accordingly, the correlations among the estimated Viterbi margins can be made equal to the correlations among the actual measurement values. Thus, it is possible to estimate Viterbi margins with high accuracy (to reduce the differences between the estimate values and the actual measurement values). Also, as the number of times the test data needs to be written onto the magnetic disk 12 is smaller than the number of write times required in a case where the index values are actually measured, the period of time required for testing can be shortened. This has been made clear by the results of simulations performed by the inventor (each test took 4200 seconds where the test data was written 1000000 times, while each test took only 480 seconds in accordance with the method of this embodiment).

Also, in this embodiment, a number of write times can be determined so as to guarantee that side erases and the likes are not caused by the above tests. Accordingly, the overshoot current that instantly convolutes the write current flowing in the magnetic head 16 can be controlled to have the largest possible value. Accordingly, the write performance of the magnetic head can be improved.

In accordance with this embodiment, a threshold value is set for each of the adjacent tracks. Accordingly, in a case where a Viterbi margin larger than the threshold value is detected in one of the adjacent tracks, the guaranteed number of write times is determined to have not been reached. Accordingly, tests on the guaranteed number of write times can be conducted with high precision.

In the above described embodiment, the optimum value among the Viterbi margins measured in each track is set as the Viterbi representative value of the track. However, the present invention is not limited to that arrangement. For example, the mean value of the Viterbi margins measured in each track, or the mean value weighted in accordance with each width-direction position may be set as the representative value of the track. In other words, each representative value should be determined by an optimum technique, with the properties of the magnetic disk 12 and the likes being taken into account.

Although Viterbi margins are measured as the index values indicating the signal quality in the above described embodiment, the present invention is not limited to that arrangement. Other index values, such as the probability (the error rate) at which reading data from a disk in a disk device fails, may be measured, for example.

In the above described embodiment, measurement is carried out from left to right in the width-direction positions (p=1→p=2→p=3) in each adjacent track, for ease of explanation. However, the present invention is not limited to that. For example, measurement may be first carried out at the center position (p=2) with respect to the width direction of the subject adjacent track, and the next measurement may be carried out at a position that is slightly offset inwardly (or outwardly) on the disk.

In the above described embodiment, the CPU of the testing device 200 (or the testing program installed in the CPU) embodies the data acquiring unit, the representative value deciding unit, and the estimating unit in the claims. However, those components may be embodied by different hardware from one another.

The present invention is not limited to the specifically disclosed embodiments, but variations and modifications may be made without departing from the scope of the present invention.

The invention claimed is:

1. A method for testing a magnetic disk device, the method comprising:
   obtaining index values indicating signal quality of an adjacent track at different positions scattered in a width direction in the adjacent track located in the vicinity of a target track on a magnetic disk after repeatedly writing data onto the target track, and determining a representative value of the index values indicating the signal quality of the adjacent track based on the obtained results, while incrementing the number of data write times; and
   estimating an index value indicating signal quality of the adjacent track to be obtained where data is written onto the target track a larger number of times than the total number of data write times the data has been actually written in obtaining the index values, the index value being estimated with the use of a plurality of representative values decided in the representative value deciding.

2. The method as claimed in claim 1, wherein estimating the index value includes estimating the index value by performing curve approximation of the plurality of representative values obtained in the representative value deciding.

3. The method as claimed in claim 1, further comprising determining whether the index value estimated in estimating the index value is larger than a predetermined threshold value.

4. The method as claimed in claim 3, wherein the threshold value varies depending on proximity of the adjacent track to the target track.

5. A device for testing a magnetic disk device, comprising:
   a data acquiring unit that obtains data about an adjacent track at different locations scattered in a width direction in the adjacent track located in the vicinity of a target track with the use of a read head of the magnetic disk device, after repeatedly writing data onto the target track on the magnetic disk with the use of a write head of the magnetic disk device;
   a representative value deciding unit that obtains index values about signal quality from the data obtained by the data acquiring unit, and decides a representative value of the index values in the adjacent track; and
   an estimating unit that estimate an index value about signal quality to be obtained where data is written a larger number of times than the total number of data write times the data has been actually written onto the target track, using the representative values decided by the representative value deciding unit with respect to different numbers of write times.

\* \* \* \* \*